O. O. Storle.
Harvester Rake.
N° 77675      Patented May 5, 1868.
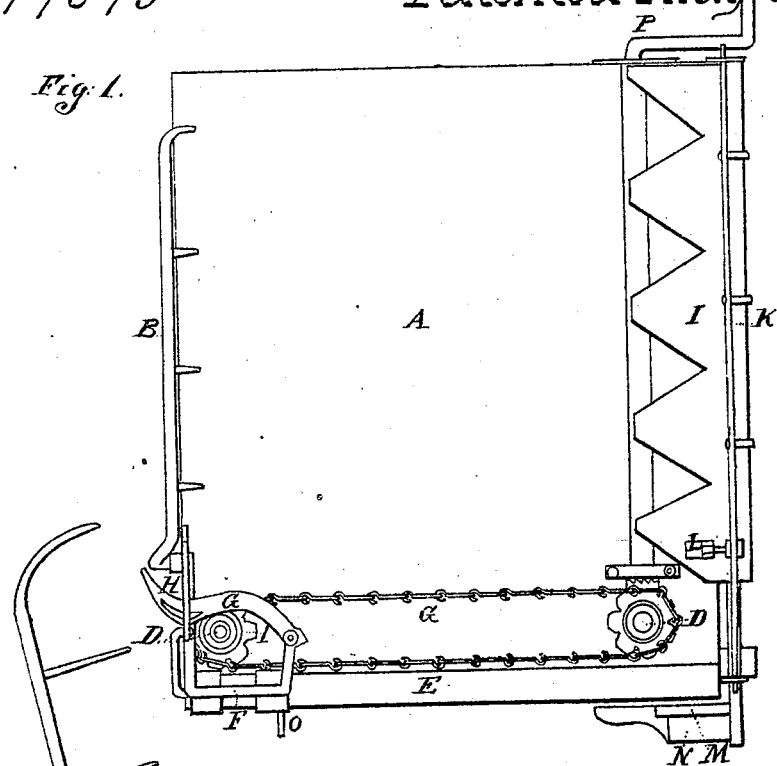
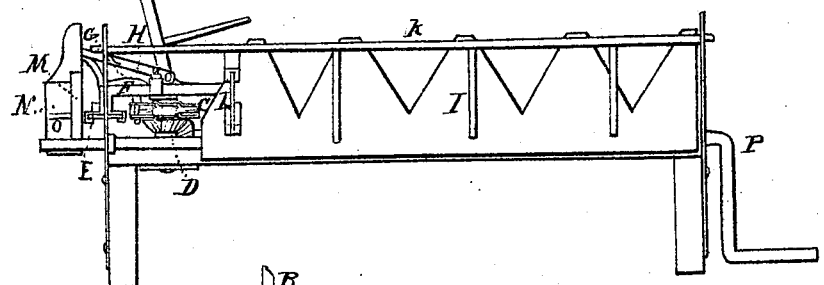
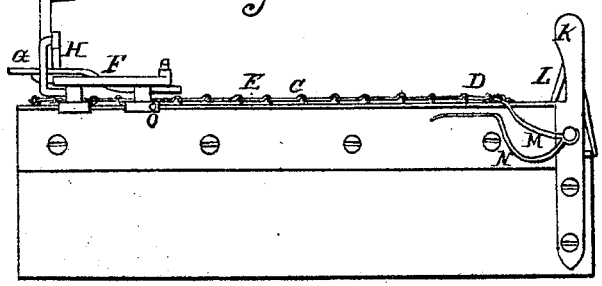
Percy B. Smith
Francis Beninghausen
Ole O. Storle
By W B Smith
his attorney

United States Patent Office.

OLE O. STORLE, OF NORTH CAPE, ASSIGNOR TO HIMSELF AND ISAAC N. MASON, OF MILWAUKEE, WISCONSIN.

Letters Patent No. 77,675, dated May 5, 1868.

IMPROVEMENT IN HARVESTER-RAKES.

*The Schedule referred to in these Letters Patent and making part of the same.*

TO ALL WHOM IT MAY CONCERN:

Be it known that I, OLE O. STORLE, of North Cape, county of Racine, and State of Wisconsin, have invented a new and useful Improvement in Grain-Raking Droppers; and I do hereby declare that the following is a full, clear, and exact description thereof, which will enable those skilled in the art to make and use the same, reference being had to the accompanying drawing, forming part of this specification, in which—

Figure 1 is a plan view of the dropper, with the rake in position to rake the grain to the tilter.

Figure 2, a side view of the dropper at the time a gavel has just been dropped.

Figure 3, a back view of the dropper with the rake standing upright, just ready to drop on the platform.

Similar letters of reference in each of the figures indicate corresponding parts.

The object of my invention is to produce a machine which will gather the grain in gavels, and drop them at the side of the harvester, on which it is used, ready for binding, and out of the way of the horses when they come round again, if the grain is not bound and removed.

A is the platform, on which the grain falls when cut; B, the rake; C, endless chain, with which the rake is operated; D and D, spur-wheels, which operate the chain C; E, rake-way; F, rake-frame, with slides on way E, and is attached to chain C; G, lever on the rake-frame, which raises and lowers the rake; H, jointed rods of the rake-frame, with which the rake is raised to an upright position by lever G; I, tilter, which throws the grain from the platform A when gathered in gavels by the rake; K, shaft with arms, against which the grain is raked to form a close gavel; L, jointed connections from tilter to shaft K; M, lever on the tilter-shaft, with which to discharge the grain; N, lever on the tilter-shaft with which to bring the tilter back in position after the grain is discharged; O, pin on the rake-frame, which operates the tilter; P, shaft, with pinion on its end meshing into a pinion on the shaft of spur-wheel D, with which the gearing of the dropper is operated.

Operation.

The dropper being attached to a harvester, with shaft P connected to the revolving works of the harvester, so that it will revolve as the harvester moves, spur-wheel D is put in motion, moving chain C round it, and spur-wheel D moving the rake. As the rake is brought to the tilter, it brings the grain on the platform forward with it, raking it on to the tilter, and pressing it against the arms of shaft K, the pin O holding the shaft K and tilter firmly in position by being above the straight part of lever N till a compact bundle is made. The pin O then slides under lever M, raising the edge of the tilter next the rake, and, as it rises, the jointed connection L turns shaft K, opening its arms, and the gavel falls to the ground. The chain moving on, round spur-wheel D, raising the rake by the lever G to a perpendicular position, and it is carried back on way E. Pin O, striking lever N, brings the tilter I and shaft K back to the proper position to receive another gavel. Rake B rides back on the way E to the spur-wheel D, and as the chain C, where the rake is attached to it, passes round the spur-wheel D, the lever G throws the rake from its perpendicular position on to the platform A, when it travels forward toward the tilter, again collecting another gavel, in order that when the grain is thin, the gavels may not be too small. A clutch may be put on shaft P, to be under the control of the driver, so that by throwing it out of gear, the rake may be stopped at the position shown, (fig. 3,) till grain enough is cut and on the platform to make a gavel the size desired, when it can be thrown into gear again, and the rake go forward and clear the platform.

What I claim as my invention, and desire to secure by Letters Patent, is—

1. Tilter I, levers M and N, rake-frame F, and pin O, in combination substantially as described.

2. Rake B, chain C, spur-wheels D and D, and rake-frame F, and lever G, in combination, substantially as and for the purpose described.

3. Rake B, tilter I, shaft K, rake-frame F, lever G, levers M and N, and pin O, in combination, substantially as and for the purpose described.

OLE O. STORLE.

Witnesses:
J. B. SMITH,
PERCY B. SMITH.